2,816,876
PHENOL-FORMALDEHYDE RESINS STABILIZED WITH TRIARYL PHOSPHITES

Louis M. Higashi, San Jose, Calif., assignor to Monsanto Chemical Company, St. Louis, Mo., a corporation of Delaware No Drawing. Application May 20, 1955
Serial No. 510,054

6 Claims. (Cl. 260—45.7)

This invention relates to phenol-formaldehyde resins. More particularly, the invention relates to liquid phenol-formaldehyde resin having a substantially permanent light color.

One of the main drawbacks to phenolic resins is that they develop a deep color ranging from yellow through orange to red during the curing operation. As a result, articles made or coated therewith must generally be made in dark colors. Even in thin films, the color is quite noticeable.

One object of this invention is to provide light colored phenolic resins.

Another object of this invention is to provide light-colored liquid phenolic resins.

A further object is to provide phenolic resins which do not substantially discolor on curing.

These and other objects are attained by the addition to phenol-formaldehyde resins of small amounts of a triaryl phosphite.

EXAMPLE I

Prepare a phenolic liquid resin by reacting 1 mol of phenol with 1.5 mols of formaldehyde in the form of a 37% solution thereof in the presence of a small amount of an alkaline catalyst such as sodium hydroxide. Divide the resin thus made into eight portions and add varying amounts of triphenyl phosphite to the portions as set forth in Table I and then bake the portions in an oven at 160° C. for 10 minutes. Table I sets forth the amount of triphenyl phosphite added to each portion, the pH thereby attained and the color of the resin after the 10-minute cure.

Table I

| Portion | Percent triphenyl phosphite by weight based on the resin | pH | Color |
|---|---|---|---|
| A | 0.0 | 7.7 | Dark red. |
| B | 0.5 | 7.4 | Light red. |
| C | 0.8 | 7.2 | Do. |
| D | 1.0 | 7.0 | Pink. |
| E | 1.2 | 6.8 | Do. |
| F | 1.5 | 6.4 | Almost colorless. |
| G | 1.8 | 5.7 | Colorless. |
| H | 2.0 | 2.0 | Do. |

It will be noticed that portions F, G and H are substantially colorless after the 10-minute heating period. When the heating period is extended to 15 minutes, no color development is observed. When the heating time is further extended, a light yellow color develops which does not materially deepen after its first development. The resins are completely cured in about 12 minutes.

EXAMPLE II

Prepare a phenol-formaldehyde liquid resin as in Example I but after formation of the resin, add sufficient acid to neutralize the alkaline catalyst so that the resin has a pH of about 7.0. Such a liquid resin, on curing, develops an orange color. When 0.2% of triphenyl phosphite is added to the resin, the pH drops to about 5.75 and no color develops on curing at 160° C. for 15 minutes. If 0.5% of triphenyl phosphite is added, the resistance to color development is extended to much longer heating periods at a curing temperature.

Attempts to attain the results of this invention by the mere addition of sufficient acid to lower the pH to 6.5 meet with failure since with, for example, hydrochloric acid a pink color develops in 10 minutes at 160° C. even when the pH is reduced to 4.0.

The phenolic resins of this invention are alkaline catalyzed condensation products of formaldehyde with phenol, cresols, xylenols, alkyl phenols such as p-tertiary butyl phenol, and polyhydric phenols such as resorcinol, and mixtures of two or more of these phenolic bodies. The formaldehyde may be used as the commercial aqueous solution known as Formalin and containing about 37% formaldehyde by weight or it may be used in the form of a solid polymer thereof such as paraform. In general, from 1.0 to 3.0 mols of formaldehyde are used for each mol of phenolic component. The reaction should be catalyzed with a hydroxide of an alkali or alkaline earth metal but not with ammonia or amines. If desired, the catalyst may be neutralized at the end of the reaction to form a soluble or an insoluble salt as desired. If an insoluble salt is formed, it may be removed by filtration prior to addition of the phosphite.

The triphenyl phosphite may be replaced in whole or in part by other triaryl phosphite such as tricresyl phosphite, trixylyl phosphite, monophenyl dicresyl phosphite, etc. The amount of phosphite to be used depends on the pH of the resin to be treated. The phosphites are acidic in nature and may be used to neutralize excess alkalinity in the resin or the resin may be neutralized with an acid before addition of the phosphite. In the latter case, it is preferable to use an acid that will form an insoluble precipitate with the alkali which precipitate can then be removed by simple filtration processes. Thus, as little as 0.2% of phosphite based on the weight of the resin is sufficient to render the resin colorless if the pH of the resin is about 7 whereas as much as 1.5% should be used when the original pH is about 7.7 and at least 2% should be used when the pH is about 8.0. In general, the amount of phosphite to be used may range from 0.2% to 5% by weight based on the resin with the limitation that enough must be used to reduce the pH to below 6.5.

The foregoing description has been limited to phenolic liquid resins because the effects obtained are more clearly apparent therein due to the fact that substantially no fillers are used therewith. However, the same effect is obtained in filled phenolic molding powders with the result that the color of the molded object is that of the filler unless added color is used to obtain a particular effect.

Conventional additives such as fillers, lubricants, dyes, and pigments and organic solvents may be added to the resins of this invention as desired.

The foregoing description and particularly the examples are illustrative of this invention and it is obvious that many variations may be made in the products and processes thereof without departing from the spirit and scope of the invention.

What is claimed is:

1. An alkaline catalyzed phenol-formaldehyde resin containing from 0.2 to 5% by weight of the resin of a triaryl phosphite, said resin having a pH of less than 6.5 prior to being cured.

2. A resin as in claim 1 wherein the triaryl phosphite is triphenyl phosphite.

3. A substantially colorless phenolic liquid resin comprising an alkaline condensation product of formaldehyde with a phenol and from 0.2 to 5% by weight of a triaryl phosphite, said resin having a pH of less than 6.5.

4. A liquid resin as in claim 3 wherein the triaryl phosphite is triphenyl phosphite and the phenol is phenol.

5. A process for preventing the development of color during the curing of a phenolic resin which comprises condensing phenol with formaldehyde under alkaline conditions to a liquid fusible state, adding thereto sufficient triaryl phosphite to reduce the pH of the liquid resin to less than 6.5, and curing the resin to an insoluble infusible state.

6. A process as in claim 5 wherein the liquid resin is neutralized to a pH of approximately 7 prior to the addition of the triaryl phosphite.

References Cited in the file of this patent
UNITED STATES PATENTS

| | | |
|---|---|---|
| 1,976,359 | Murray | Oct. 9, 1934 |
| 2,419,354 | Howland et al. | Apr. 22, 1947 |
| 2,437,046 | Rothrock et al. | Mar. 2, 1948 |
| 2,493,597 | Rothrock et al. | Jan. 3, 1950 |
| 2,612,488 | Nelson | Sept. 30, 1952 |
| 2,676,945 | Higgins | Apr. 27, 1954 |